United States Patent
Landis et al.

[15] 3,691,340
[45] Sept. 12, 1972

[54] WELDING ELECTRODE WITH LITHIUM SHIELDING METAL

[72] Inventors: George G. Landis, Cleveland; John M. Parks, Solon; Kenneth L. Brown, South Euclid, all of Ohio

[73] Assignee: The Lincoln Electric Company, Cleveland, Ohio

[22] Filed: Jan. 13, 1970

[21] Appl. No.: 2,643

Related U.S. Application Data

[63] Continuation-in-part of Ser. No. 618,979, Feb. 27, 1967, abandoned, Continuation-in-part of Ser. No. 493,615, Sept. 24, 1965, abandoned, Continuation-in-part of Ser. No. 289,871, June 24, 1963, abandoned.

[52] U.S. Cl. ............... 219/146, 29/191.6, 75/138, 148/24, 219/137
[51] Int. Cl. ............................................. B23k 35/22
[58] Field of Search ........ 148/24; 29/191.6; 219/146; 75/138, 289, 871, 493, 615, 618, 979

[56] References Cited

UNITED STATES PATENTS

| | | |
|---|---|---|
| 2,909,648 | 10/1959 | Landis et al. ........... 219/146 X |
| 3,081,534 | 3/1963 | Bredzs ...................... 75/148 X |
| 3,272,624 | 9/1966 | Quaas ........................ 75/138 |
| 1,620,082 | 3/1927 | Czochialski ................. 75/138 |
| 2,087,269 | 7/1937 | Stroup ........................ 75/138 |
| 2,505,937 | 5/1950 | Bernard ................. 29/191.6 X |
| 2,062,457 | 12/1936 | Johnston .................. 148/24 X |
| 2,282,175 | 5/1942 | Emerson ...................... 148/24 |
| 2,052,740 | 9/1936 | Barer et al. ........... 29/191.6 X |
| 3,468,695 | 9/1969 | Federman ............. 29/191.6 X |
| 867,659 | 10/1907 | Hoopes et al. ............ 29/191.6 |
| 2,915,391 | 12/1959 | Criner ..................... 75/138 X |
| 3,073,720 | 1/1963 | Mets ........................ 75/138 X |
| 309,439 | 12/1884 | Chillingworth et al. ...29/191.6 |

Primary Examiner—Allen B. Curtis
Attorney—Meyer, Tilberry and Body

[57] ABSTRACT

An electric arc welding electrode comprised principally of an elongated steel member having associated therewith lithium alloyed with or coated over with other low boiling temperature metals plus metals of higher melting temperatures for delaying the boiling action of the low boiling temperature metals. The member may be striated and these metals fill the striations.

12 Claims, 7 Drawing Figures

PATENTED SEP 12 1972

3,691,340

INVENTORS
GEORGE G. LANDIS
JOHN M. PARKS
KENNETH L. BROWN

BY *Meyer, Tilberry & Body*
ATTORNEYS.

WELDING ELECTRODE WITH LITHIUM SHIELDING METAL

This application is a continuation-in-part of our copending application, Ser. No. 618,979 filed Feb. 27, 1967, now abandoned, which is a continuation-in-part of our copending application, Ser. No. 493,615, filed Sept. 24, 1965, now abandoned, which is a continuation-in-part of our application Ser. No. 289,871, filed June 24, 1963, now abandoned.

This invention pertains to the art of electric arc welding and more particularly to welding with a bare metal electrode without the use of non-metallic fluxes or shielding gases.

In the past numerous methods and arrangements have been employed to shield the electric arc from the atmosphere, all of which have had various difficulties which the present invention attempts to overcome.

For example, various non-metallic fluxing materials have been coated on a metal core wire. These materials either melt and/or vaporize in the heat of the arc to exclude the atmosphere and protect the deposited weld metal until it solidifies. Coated electrodes, while used extensively, have certain difficulties. They are relatively expensive to manufacture. They leave a slag on top of the weld bead which must be removed. Sometimes this slag clings tenaciously to the weld bead and is difficult to remove. Furthermore, continuous or automatic welding has been practically impossible with coated electrodes. The coating is an electrical insulator and it is economically unfeasible to energize the core wire through the coating. Thus the electrodes are made relatively short and the end opposite the arcing end is bared of coating and electrical contact is made on this end. The length of such an electrode is limited because of the heating effects of the electric current flowing through long lengths of the core wire for prolonged periods.

A granulated flux material has also been employed which is deposited as a windrow on the weld seam. A bare electrically energized electrode is advanced through this flux toward the workpiece and an arc is maintained underneath the flux. The flux serves the function of shielding the brilliant glare of the arc from the eyes of the operator as well as melting and vaporizing to protect the arc from the surrounding atmosphere. Using granulated flux, it is possible to use a bare electrode which is continually advanced toward the workpiece and only a small length of the electrode is carrying electric current at any time but the weld pool is at all times obscured from the operator.

The use of granulated flux is messy, expensive and requires the feeding of two distinct materials simultaneously to the arc; namely, the flux and the electrode.

The inert gases have also been employed to shield the arc from the effects of the atmosphere. These gases are flowed from storage tanks through flexible hoses to the tip of a welding gun, which in some cases, contains intricate wire feed mechanism. Particularly where a wire feed mechanism is built into the welding gun, it is conventional to employ water cooling to conduct away the radiated heat of the arc which would otherwise damage such mechanism. In any event, the storage tanks are themselves bulky and heavy. Additionally, the flexible hoses to feed the inert gas and the cooling water passes in the welding gun add to the bulk an intricacy of an already bulky and complicated device. Further, the inert gases are relatively expensive.

Notwithstanding the above difficulties, inert gases have been used extensively in the non-ferrous and stainless steel arc welding field but only in limited application and under limited conditions in the low-alloy or no-alloy steel welding field.

More recently there has come into use a method of shielding the arc from the atmosphere employing carbon dioxide gas mixtures. Such method, while extremely effective, still requires the use of a separate source of shielding gas with its bulky and heavy tank, an unwieldy hose and cumbersome welding heads.

U.S. Pat. No. 2,909,648, dated Oct. 20, 1959 and assigned to the assignee of this application, proposes a solution to these problems and describes the use of a metallic coating on the surface of a steel electrode, which coating vaporizes in the heat of the arc to provide a metallic vapor shield around the arc and exclude the atmosphere from the vicinity of the molten weld pool. At the time that the application resulting in that patent was filed, it was believed that the upper limit on the boiling temperature of the metal of this coating should be the boiling temperature of the metal being welded, which in the case of steel is approximately 2,800°C. Further research on the use of metals to produce a metallic vapor shield now indicates that the maximum boiling temperature of the shielding metal should not exceed the melting temperature of the electrode, which for steel is 1,535°C. Also, such research indicates that there is one metal not included in that patent having a boiling temperature below the melting temperature of steel (1,535°C), which is not only desirable but necessary to obtain sound weld beads.

Of these various metals, some result in lower voltage gradients in the arc than others. Lithium is the lowest and tends to produce a broad diffuse arc which heats the plate being welded more uniformly than a sharply defined arc. Also the arc temperature, when lithium is present, is below 5,500°K, the disassociation temperature of nitrogen. Nitrogen in the disassociated state is quite reactive and is picked up readily by the weld pool.

In accordance with the invention, at least lithium is always employed as a shielding metal. The minimum amount of lithium required in accordance with the invention is that required to shield the arc while the maximum is dictated by the economics of welding. Lithium is expensive. From 0.05 to 1 percent of the total electrode weight is lithium in accordance with the invention.

Other metals may be used to supplement the shielding action of lithium. These supplementary shielding metals should have the following characteristics:

1. a melting temperature less than the melting temperature of steel (1,535°C);
2. a chemical inertness to nitrogen at temperatures ranging from slightly below to above the melting temperature of steel;
3. a boiling temperature not in excess of the melting temperature of the steel;
4. an alloying characteristic with steel which is not detrimental to the strength, ductility, etc.

Many metals having boiling temperatures less than the melting temperature of steel (1,535°C) fall into these four classifications. Many of these metals, however, because of their expense, unavailability or toxicity either of the metal itself or of its oxide, would only be employed in a laboratory and may thus be excluded from the practical aspects of the invention.

Of these metals having a moderate cost, the following fall within the four classifications: noted above barium, cadmium, zinc, magnesium, strontium, sodium, potassium, calcium and bismuth. Accordingly, these come within the scope of the invention and one or more of such metals may be used in conjunction with lithium. While the shielding metals may be used in any amount, a preferred quantity of shielding metal will comprise from 0.05 to about 5.0 percent by weight of the electrode.

It is to be noted that U.S. Pat. No. 2,909,648 lists some of these metals as a shielding metal, namely, bismuth, cadmium and strontium, and insofar as these three metals are employed without lithium, they are excluded from the present invention. However, such metals if used in combination with other features of the invention are then included.

These metals, referred to generically hereinafter as shielding metals, may be fed into the arc in any desired manner such that they will vaporize and create a cloud of metallic vapor shielding the arc from the electrode tip to and including the molten weld pool; for example, on the inside of a tube, as a separately fed strip or ribbon, but preferably and in accordance with one phase of the invention, as a thin uniform coating around the surface of a solid steel core or tube.

When these metals are fed into the arc as a coating on the external surface of a steel core or tube, it is necessary, in accordance with the invention, that the coating or coatings, if there be more than one, be so bonded to the steel core or the immediate underlaying coating as to have the maximum degree of heat conductivity therebetween. Normally, to obtain such heat conductivity, the various coatings must be metallurgically bonded.

Depending on the mode of applying the shielding metal, not all of those above listed will metallurgically bond to a steel core and if with the particular shielding metals selected such metallurgical bonding cannot be obtained, then in accordance with the invention, the shielding metal is either alloyed with a metal which will itself bond with the steel core or an intermediate layer of a metal is first applied to the steel core, which metal will metallurgically bond both with the steel core and with the shielding metal or the metal with which the shielding metal is alloyed. Metals which readily metallurgically bond to steel and which are low in cost and easily applied are zinc, copper, aluminum, tin and cadmium. Normally, these metals will be applied in what may be termed a flash or strike of a thickness of 0.001 inch. It is to be noted that some of these metals, for example, zinc and cadmium, can thus serve both as a bonding metal and as a shielding metal. If the bonding metal is to be made of zinc or cadmium, it can be have a slightly greater thickness than just stated. It is to be noted that the oxides of zinc and cadmium are considered somewhat toxic so that these metals should not be used to excess.

For the maximum protection of the arc from the atmosphere, it is necessary that the production of the metallic vapor start at least a short distance above the arcing tip of the electrode and preferably continue on down to the actual arcing tip of the electrode. With the shielding metals listed, it will be appreciated that with boiling temperatures below the melting temperature of steel, they will have boiled off from the surfaces of the steel core before reaching the actual arcing tip of the electrode. Thus, the invention contemplates means for modifying the boiling action of the shielding meal so that it commences to boil at a point on the electrode slightly spaced from the arcing tip and continues to boil down to the arcing tip of the electrode. Such modifying means may, in accordance with the invention, be a metal having a melting or boiling temperature above the boiling temperature of the shielding metal(s) itself or both. Thus, if lithium having a low boiling temperature (1,370°C) is alloyed with a modifying metal such as aluminum having a boiling temperature of 2,330°C and such alloy is coated onto a steel core, the lithium commences to boil when it reaches its boiling temperature but due to the proximity of the lithium to the aluminum with a much higher boiling temperature, the completion of the boiling action of the lithium is retarded until the aluminum itself reaches the boiling temperature close to or at the arcing tip of the electrode such that the shielding metal is able to perform its shielding action over the maximum distance. It is also to be noted that by so modifying or retarding the boiling action of the lithium, then any beneficial effects of the shielding metal on the action of the arc itself such as confining the arc in a manner similar to shielding gases such as helium, can be enhanced.

The modifier for retarding the boiling action of the shielding metal(s) must have generally the following further characteristics:

1. A boiling temperature substantially in excess of the melting temperature of steel and preferably close to or slightly above the temperature of the molten metal in the weld pool which measurements have indicated to be on the order of 2,100° to 2,200°C; and,
2. An alloying characteristic with steel which is not detrimental to its strength, ductility and the like.

Modifying metals fitting within this general classification are generally: manganese, lead, aluminum, silicon, cobalt, copper and nickel. While any quantity of modifier metal may be employed, a preferred quantity is between about 0.05 and about 10.0 percent of the electrode weight.

It is to be noted that of these metals, aluminum, silicon and manganese are considered to be desirable killing agents with manganese the least. On the other hand, manganese in even relatively large amounts is considered to be a desirable alloying agent while silicon in somewhat lesser amounts is considered to be a desirable alloying agent. Small amounts of aluminum also contribute to grain refinement.

At room temperatures, many of the shielding metals listed, e.g., all of those except cadmium and zinc, are quite reactive with the oxygen in the atmosphere, particularly in the presence of the humidity of the atmosphere and this appears to be so even though the shielding metal(s) is alloyed with a modifier metal such as aluminum prior to being coated on the steel core such that an electrode which welds satisfactorily immediately after manufacture, will not after exposure to the atmosphere for relatively brief periods of time, from an hour to several days, weld satisfactorily. Thus, the invention further contemplates some form of protector which will prevent the shielding metal(s) or its alloy from reacting with the atmosphere and deteriorating. Such shielding metal protector may be a thin coat or strike of a material which is non-reactive to the atmosphere even in high humidity, for example, a coating of antimony, aluminum, magnesium, zinc, nickel, silver, tin, lead, copper, cadmium or manganese, either as elements or alloys or may be an organic coating such as mineral oil or the like which will exclude the atmosphere from the highly reactive shielding metals. Alternatively the portion of the shielding metal at the outer surface of the coating may be reacted with an element or compound which will in turn from a compound which is impervious to water vapor. Nickel is a preferred protector metal and is preferably employed in amounts comprising between about 1 and about 20 percent of the total electrode weight.

The various coatings of metals above described may be applied to the electrode core in any desired manner, such as dipping, that is to say, passing the electrode through a molten bath of the desired metal(s), electroplating, spraying or vacuum deposition. Spraying or dipping is preferred. The particular method employed will depend on the nature of the metal or alloy employed. In any event, it is necessary or desirable to thoroughly clean the surface of the steel core preparatory to whatever coating process is employed and it is also desirable or necessary to protect the electrode from the atmosphere as it passes from one coating process to the next.

The electrode core, as previously stated, may be either a solid steel wire, or a tube which may or may not have on the inside ingredients which will further contribute to the shielding of the arc or the alloying of the deposit of weld bead and the wire may have one or more striations formed along its surface which are filled by the shielding and modifier metals. In this respect it is to be noted that there is a substantial difference when a particular metal is fed into the arc on the outside of either a tube or a solid core. In the former instance, the efficiency of the transfer of the metals is much better than in the latter case.

In any welding of ordinary low carbon steel, it is usually necessary to have some killing agent such as manganese, silicon or aluminum which will be carried over into the weld pool. These metals assist in preventing porosity of the weld bead and otherwise contribute to the overall strength and ductility thereof. If one or more of these meals is included in the coating, then the steel core may be of plain low carbon steel having no or a minimum amount of alloying ingredients such as silicon or manganese. If none of these three meals are used in the coating, then the steel of the core should preferably have one or more of these three metals alloyed therewith. It is further to be noted that some silicon is desirably present either in the electrode core or in the coating for the reason that the silicon, at least in part, reacts with plate scale (iron oxide) or with oxygen in the atmosphere to form silicon dioxide. Silicon dioxide is an excellent wetting agent to steel and assists in the formation of a desirable bead shape.

The total composition of the electrode to be employed will generally vary with the type of welding to be performed, e.g., vertical or downhand welding. The type of metal transfer from the electrode tip to the workpiece, e.g., drop transfer or spray transfer, depends upon the requirements of the particular welding job.

Thus for vertical welding there must either be a spray transfer of metal from the electrode to the workpiece or drop transfer. If drop transfer is employed, the arc characteristics must be such that the molten drops as they are formed on the electrode end are transferred into the weld pool by the forces of the surface tension of the molten metals.

For any given electrode material and coating thereon, there is a current below which the electrode end melts and forms droplets and above which the electrode metal is projected to the workpiece as fast as it becomes liquid such that the drops do not have time to form and the metal goes to the workpiece in what is known as a spray transfer.

For any given thickness of workpiece there is generally a maximum current which can be employed so that it is not always possible to use welding currents of the type which will give a spray transfer.

For vertical welds of relatively thin workpieces, e.g., one-eighth of an inch or less, currents on the order of 125 to 350 amp. are normally employed. These currents are generally insufficient to give a spray transfer and thus for such workpieces a drop transfer type of welding must be employed.

Lithium and other shield metals and modifiers may be mixed or alloyed in any desired ratios but from 1–25 percent lithium and the balance modifier and the other shielding metals is in accordance with the invention. The total of the two groups of metals to the electrode weight is in the range of 0.10 to 10 percent.

A still further problem is applying the lithium and other metals if used to the steel base wire in uniform amounts over long lengths of wire. The present invention accomplishes this result by roughening the surface of the wire so that the shield metals will fill the depressions formed by such roughening.

The principal object of the invention is the provision of a new and improved base welding electrode which enables the welding in air without the use of independently supplied shielding gases or welding fluxes.

Another object of the invention is the provision of a new and improved welding electrode which employs the use of metal vapors to shield the arc from the atmosphere.

Another object of the invention is the provision of a new and improved welding electrode which enables sound weld beads to be obtained using relatively simple welding apparatus.

Another object of the invention is the provision of a new and improved welding electrode having a coating of lithium on its outer surface, which lithium can vaporize in the heat of the arc to shield the arc from the atmosphere.

Still another object of the invention is the provision of a new and improved welding electrode which has many of the characteristics of a gas shielded arc but which does not require the use of independently supplied gases.

Still another object of the invention is the provision of a new and improved welding electrode having metals coated on the outer surface thereof which assists in the transfer of the metal from the electrode tip to the weld pool.

Another object of the invention is the provision of a new and improved arrangement for including lithium as a coating on a welding electrode.

Another object of the invention is the provision of a new and improved welding electrode which has a coating or coatings of metals thereon which metals have a range of boiling temperatures such as to protect the arc from the atmosphere.

Still another object of the invention is the provision of a new and improved welding electrode which has a coating containing at least lithium and an exterior coating sufficient to protect the lithium or lithium alloy from reacting with the atmosphere.

The invention, of course, in its preferred embodiment, may take physical form in a number of different arrangements, preferred embodiments of which will be described in greater detail in this specification and illustrated in the accompanying drawing.

Figure 1:
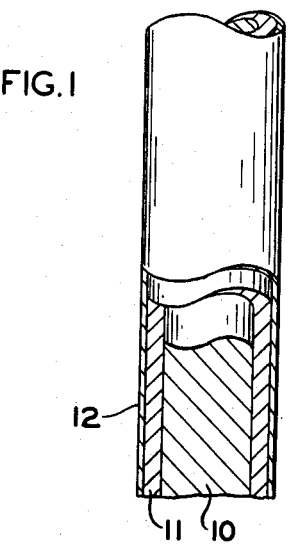
FIG. 1 is a cross-sectional view greatly enlarged of a welding electrode illustrating a preferred embodiment of the invention.

Referring now to the drawings wherein the showings are for the purposes of illustrating preferred embodiments of the invention only and not for the purposes of limiting same, FIG. 1 shows s short section of a welding electrode of indeterminate length which is adapted to be electrically energized and continuously fed towards a workpiece while an arc is maintained between the end of the electrode and the workpiece to continuously melt off the end of the electrode and deposit the molten metal in a pool on the workpiece.

The electrode shown in comprised generally of a core 10, a first coating 11 which normally includes a shielding metal and a modifier therefor and a second coating 12.

The core 10 in the preferred embodiment is low carbon steel having 0.5 percent silicon and 1 percent manganese and a diameter of approximately 0.045 inch. Obviously, the invention is not limited to the use of this specific metallurgical analysis of the core nor to this diameter. In accordance with the invention, the core may have a range of from one thirty-second to one-eighth inch.

The coating 11 in the preferred embodiment is comprised of an alloy as follows in percents by weight:

|    | I  | II | III | IV | V  | VI | VII |
|----|----|----|-----|----|----|----|-----|
| Li | 20 | 10 | 10  | 17 | 10 | 15 | 15  |
| Bi |    |    |     |    | 15 |    |     |
| Al | 80 | 80 | 75  | 20 | 75 | 50 | 20  |
| Si |    |    | 5   |    |    |    |     |
| Ni |    | 10 | 10  |    |    |    |     |
| Zn |    |    |     | 39 |    | 35 | 35  |
| Cu |    |    |     | 19 |    |    | 30  |
| Mn |    |    |     | 5  |    |    |     |

In all instances it is to be noted that the aluminum, nickel and/or silicon are modifiers for the basic shielding metal and these modifier metals retard the boiling action of the shielding metal so that it commences to boil at a point spaced from the arcing tip and continues to boil down to and including the arcing tip of the electrode.

It is obvious that the amount of lithium employed on a given electrode may be varied either by varying the thickness of the coating 11 or by varying the percentage of the lithium in the alloy of the coating 11 or both.

The coating 12 in the preferred embodiment is aluminum of a thickness of approximately 0.001 inch. Obviously, a greater thickness of aluminum may be used. The major function of this coating 12 is to protect the lithium in the coating 11 from the atmosphere. A minor function in the case of aluminum is to retard the melting and boiling of the lithium.

Figure 2:
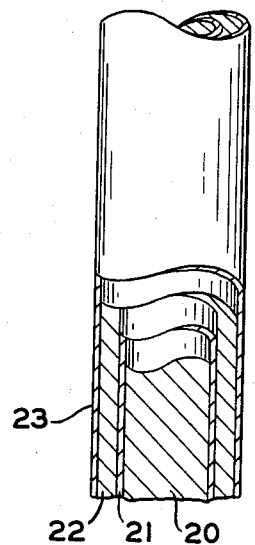
FIG. 2 is a cross-sectional view similar to FIG. 1 illustrating an alternative embodiment of the invention.

FIG. 2 shows a section of a continuous indeterminate length of electrode comprised of a core 20, a bond coating 21, a shielding metal coating 22 and a protective coating 23.

The core may be of a metallurgical analysis similar to that of core 10 or may be ordinary low carbon steel containing no alloying agents, it being noted that when aluminum or silicon are placed in the external coating 22, that it is ordinarily not necessary to include alloying ingredients or killing agents in the core 20.

The coating 21 is comprised generally of a strike of copper in a thickness of 0.0001 inch. This coating can also be barium, aluminum, cadmium, nickel or zinc, it being noted that the prime requirement of this coating is to provide a metallurgical bonding agent between the steel core 20 and the coating 22.

The coating 22 in the embodiment shown in FIG. 2 may have the same compositions as those described with reference to the coating 11 of FIG. 1.

In a like manner, the coating 23 may be aluminum or nickel having a thickness of from 0.001 inch up to the thickness of the coating 22.

It is to be noted that in some instances the coating 12 or the coating 23 can be of a mineral oil or the like, if the only function of this coating is to protect the shielding metals in the coatings 11 or 22 from the atmosphere. Such oils are not detrimental to the welding. They burn or are otherwise consumed in the atmosphere and ordinarily there is no carbon recovery in the metal of the weld bead.

Figure 3:
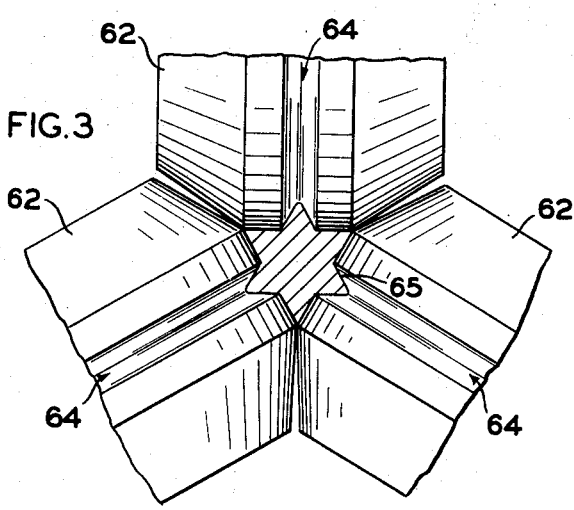
FIG. 3 is a cross-sectional view greatly enlarged illustrating a still further alternative embodiment of the invention.

In the embodiment of the invention shown in FIG. 3 the core instead of having circular cross-section as in the embodiment of FIG. 1 is generally in the configuration of a six-pointed star, being comprised of a central body 52 and six integral points or lobes 53 projecting radially outwardly from the body 52 and being equally spaced around the periphery thereof. These lobes 53 define a plurality of longitudinally extending striations or grooves 54 and these grooves along with the outer surface of the lobes 53 are filled and covered, respectively, with a shielding meal of metal composition as described with reference to FIG. 1.

The surfaces of the lobes 53 and thus the surfaces of the grooves 52 are shown as having plane surfaces which intersect at a definite angle. Obviously these surfaces may be arcuate and intersect tangentially. More or fewer lobes can be provided so long as at least a portion of the intersecting surfaces provide a concavity or outwardly facing groove, with groove receives and retains the shielding metal.

The depth of the grooves may be as desired, depending upon the desired percentage weight of shielding metal in relation to the total weight of the electrode, or in relation to the weight of the steel core. In the preferred embodiment, the outer surfaces of the lobes 51 define a circle 0.045 inch in diameter and the maximum depth of each groove measured from the circle is between 0.007 and 0.0014 inch.

Figure 4:
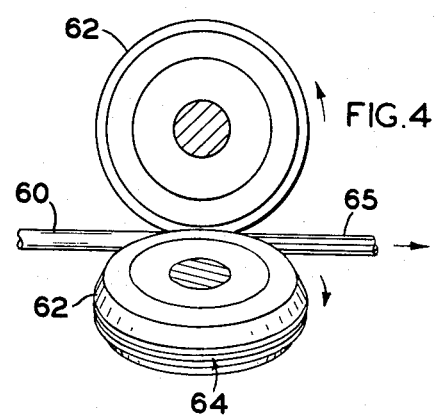
FIG. 4 is a cross-sectional view of the steel base wire of FIG. 3 showing the position of the forming rolls for grooving or striating the core wire.
Figure 5:
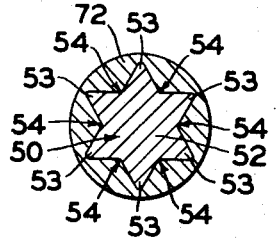
FIG. 5 is a side elevational view somewhat schematic showing the location of the rolls for grooving or striating the core wire.
Figure 6:
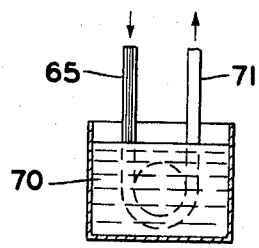
FIGS. 6 and 7 are side elevational views partly in cross-section and somewhat schematic showing the steps of coating the core wire.
Figure 7:
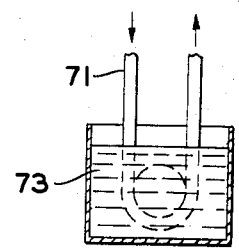

FIGS. 3 and 4 show how the lobes 53 and grooves 54 are formed. A cylindrical wire 60 is advanced along a path of movement and at one point on this path of movement three grooved rolls 62 are mounted for rotation on axes which intersect at a 120° angle. These rolls each have a tapered groove 64 in their outer surface having an included angle of 60°. These rolls 62 may be mounted in any conventional manner, not shown, so that they can exert very high radial forces on the cylindrical wire. The wire 65 with the shape of that shown in FIGS. 3 and 5 leaves the rolls and as shown in FIG. 6 is then passed through a molten bath 70 of the desired shielding metal from where it emerges as a coated electrode 71 with the shielding metal 72 filling the grooves and coating the outer surface of the lobes 53 as is shown in FIG. 5.

Because of the grooves, larger amounts of shielding metal in relation to the total electrode weight can be readily obtained. Furthermore, the use of these grooves enables for greater accuracy of weight of shielding metal in relation to the total weight of the electrode than is obtainable with the circular configuration of FIG. 1. After the molten metal has congealed, various means can be employed for the purpose of protecting the lithium of the coating from the adverse effects of the atmosphere. Inasmuch as lithium is extremely reactive with water, non-aqueous means must be employed for this purpose. A protective metal coating may be hot sprayed on or the coated electrode 71 may be passed through a material which will react with minor amounts of the lithium on the surface of the coating to form a compound which is resistant or impervious to water and water vapor and thus will prevent the remainder of the lithium below the surface of the coating from further reaction with the moisture of the atmosphere.

In accordance with the preferred embodiment of the invention, the electrode 71 after it leaves the coating bath 70 and before it is cooled fully is passed through a bath of a fatty acid such as steric acid 73 heated to a temperature between 200° and 400°C at which temperatures the acid will react with the lithium to form lithium stearate, a compound which is resistant to water and water vapor. The stearic acid also coats the electrode surface with an oily film further protecting the lithium.

It will be appreciated that the electrode is what may be termed a "bare electrode" in that there is no non-metallic coating on the outside of a type which will prevent electrical contact with the metal of the electrode. Thus, by "bare" is meant an electrode which may be continuously contacted by sliding contact to electrically energize the electrode relative to the workpiece.

It is also appreciated that the electrode is capable of depositing weld beads while welding in the air. By welding in air is meant that there are no independently supplied welding fluxes or shielding gases. This is not to say that auxiliary shielding gases or granular flexes cannot also be employed.

The invention has been described with reference to a preferred embodiment. Obviously modifications and alterations will occur to others upon reading and understanding of this specification and it is my intention to include such alternations and modifications insofar as they come within the scope of the appended claims.

Having thus described our invention, we claim:

1. A welding electrode comprised of a steel base wire having on the exterior surface thereof a coating comprised of lithium alloyed with one or more modifier metals selected from the class consisting of aluminum, silicon, manganese, lead, nickel, cobalt and copper in approximate ratios of 10–25 percent lithium and the balance comprising modifier metals and an exterior coating of one or more metals selected from the class consisting of aluminum, manganese, magnesium, lead, copper, silver, tin, nickel, cadmium and zinc and all of said metals having a weight of from 0.10 to 10 percent of the total weight of the electrode.

2. A welding electrode comprised of an elongated steel member in combination with an alloy comprised of lithium and aluminum in approximate ratios of 10–25 percent lithium and the balance comprising aluminum and having a weight of from 0.10 to 10 percent of the total weight of the electrode.

3. The electrode of claim 2 wherein the combination includes nickel in approximate amounts of form 1–20 percent of the weight of the electrode.

4. The electrode of claim 1 wherein said coating includes an outer layer of nickel in approximate amounts of from 1–20 percent of the total weight of the electrode.

5. A welding electrode capable of welding in the air without the use of externally supplied fluxes or gases comprised of an elongated steel number in combination with an alloy of one or more metals capable of vaporizing and shielding the arc from the atmosphere selected from the class consisting of: cadmium, zinc, magnesium, lithium, strontium, sodium, potassium, calcium and bismuth and one or more modifier metals capable of delaying the boiling of such shielding metals selected from the class consisting of aluminum, silicon, manganese, nickel, cobalt, lead, silver and copper, the shielding metal being present in proportions of from 0.05 to 5.0 percent of the weight of the electrode and the modifier metal being present in amounts of from 0.5 to 10 percent of the total weight of the electrode, the shielding metals and modifier metals being mixed in appropriate proportions of from 10–25 percent lithium and the balance comprising non-lithium shielding metals and modifier metals and the alloy of the shielding and modifier meals is present in amounts of from 0.10 to 10 percent of the total weight of the electrode.

6. A welding electrode capable of welding in the air without the use of externally supplied fluxes or gases comprised of an elongated steel member in combination with an alloy of one or more metals capable of vaporizing and shielding the arc from the atmosphere selected from the class consisting of: cadmium, zinc, magnesium, lithium, strontium, sodium, potassium, calcium and bismuth and one or more modifier metals capable of delaying the boiling of such shielding metals selected from the class consisting of aluminum, silicon, manganese, nickel, cobalt, lead, silver and copper, the shielding metal essentially containing from 10–25 percent by weight lithium and being present in proportions of from 0.05 to 5.0 percent of the weight of the electrode and the modifier metal being present in amounts of from 0.05 to 10 percent of the total weight of the electrode and a second and outer coating consisting of a metal selected from the class consisting of: aluminum, antimony, magnesium, zinc, nickel, silver, tin, lead, copper, cadmium, or manganese.

7. A welding electrode comprised: of a steel wire having a plurality of longitudinally extending grooves, said grooves being filled with metals capable of vaporizing in the heat of the arc and providing a shield of metallic vapor, said metals including lithium and one or more metals selected from the class consisting of barium, cadmium, zinc, magnesium, strontium, sodium, potassium, calcium, and bismuth and one or more modifier metals selected from the class consisting of aluminum, manganese, lead, copper, silver and tin, said lithium comprising between 10–25 percent of the total of said metals.

8. The electrode of claim 7 wherein said electrode has a coating of a metallic compound of a fatty acid.

9. The electrode of claim 7 wherein said wire has six longitudinally extending lobes defining a like number of longitudinally extending grooves.

10. A welding electrode comprised of: a steel wire having a plurality of longitudinally extending lobes defining a plurality of longitudinally extending grooves in the surface of said wire; said grooves containing a plurality of shielding metals, one of which is lithium, plus one or more shielding metals selected from the class consisting of barium, cadmium, zinc, magnesium, strontium, sodium, potassium, calcium and bismuth, said lithium comprising 10–25 percent of said shielding metals.

11. The electrode of claim 10 wherein said metals are comprised of lithium and aluminum in approximate ratios of 10–25 percent lithium and the balance comprising aluminum.

12. The electrode of claim 10 wherein said metals are comprised of at least 10–25 percent lithium and the balance is comprised of one or more metals selected from the class consisting of aluminum, manganese, lead, magnesium, copper, silver, tin, nickel, cadmium and zinc, sodium, potassium and calcium.

* * * * *